United States Patent [19]

Siciliano et al.

[11] Patent Number: 5,810,136
[45] Date of Patent: Sep. 22, 1998

[54] SUPPLY LINE FOR AN ELECTRIC VEHICLE AND TRANSPORT SYSTEM USING IT

[75] Inventors: Vito Siciliano, Pieve Ligure; Alcide Del Naja, Naples, both of Italy

[73] Assignee: Ansaldo Trasporti S.p.A., Naples, Italy

[21] Appl. No.: 698,620

[22] Filed: Aug. 16, 1996

[30] Foreign Application Priority Data

Aug. 22, 1995 [IT] Italy .................................. TO95A0692

[51] Int. Cl.⁶ ...................................................... B60M 1/10
[52] U.S. Cl. .............................................................. 191/18
[58] Field of Search ................................. 191/14, 16, 17, 191/18, 19

[56] References Cited

U.S. PATENT DOCUMENTS

| | | | |
|---|---|---|---|
| 399,091 | 3/1889 | Smith | 191/18 |
| 458,866 | 9/1891 | Van Depoele | 191/18 |
| 767,534 | 8/1904 | Whittler | 191/18 |
| 807,199 | 12/1905 | Palmer | 191/18 |
| 898,216 | 9/1908 | Granger | 191/18 |
| 955,753 | 4/1910 | Brown et al. | 191/18 |
| 1,044,819 | 11/1912 | Purvis et al. | 191/18 |

FOREIGN PATENT DOCUMENTS

| | | |
|---|---|---|
| A-1151382 | 1/1958 | France . |
| C-129 973 | 4/1902 | Germany . |
| B-1011914 | 7/1957 | Germany . |

Primary Examiner—S. Joseph Morano
Attorney, Agent, or Firm—Quarles & Brady

[57] ABSTRACT

A supply line (1) for an electric vehicle (80) has a plurality of conductive plates (34) alternating with insulating plates (37) and disposed along a top of a long hollow insulating casing (4) in a direction of travel for an electric vehicle (80). An elastically deformable ribbon-like conductive element (60) including a strip of ferromagnetic material (63) is also disposed in the hollow casing (4). The ribbon-like conductive element (60) is attracted by a magnetic field induced by electromagnets (84) carried by the electric vehicle (80) to cause deflection of the portion of the ribbon-like conductive element (60) towards the conductive plates (34) until at least one conductive plate (34) contacts a supply line carried within the casing (4). The electric vehicle (80) also has at least one pickup (87) which contacts the conductive plates (34) to supply electricity of at least one polarity to the electric vehicle (80).

17 Claims, 5 Drawing Sheets

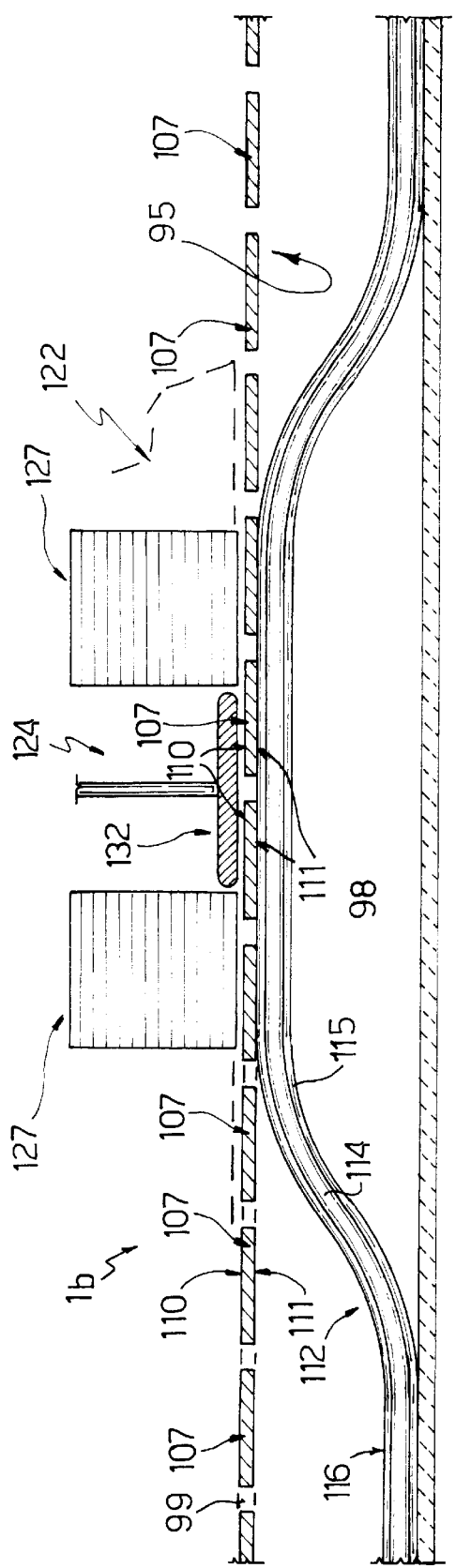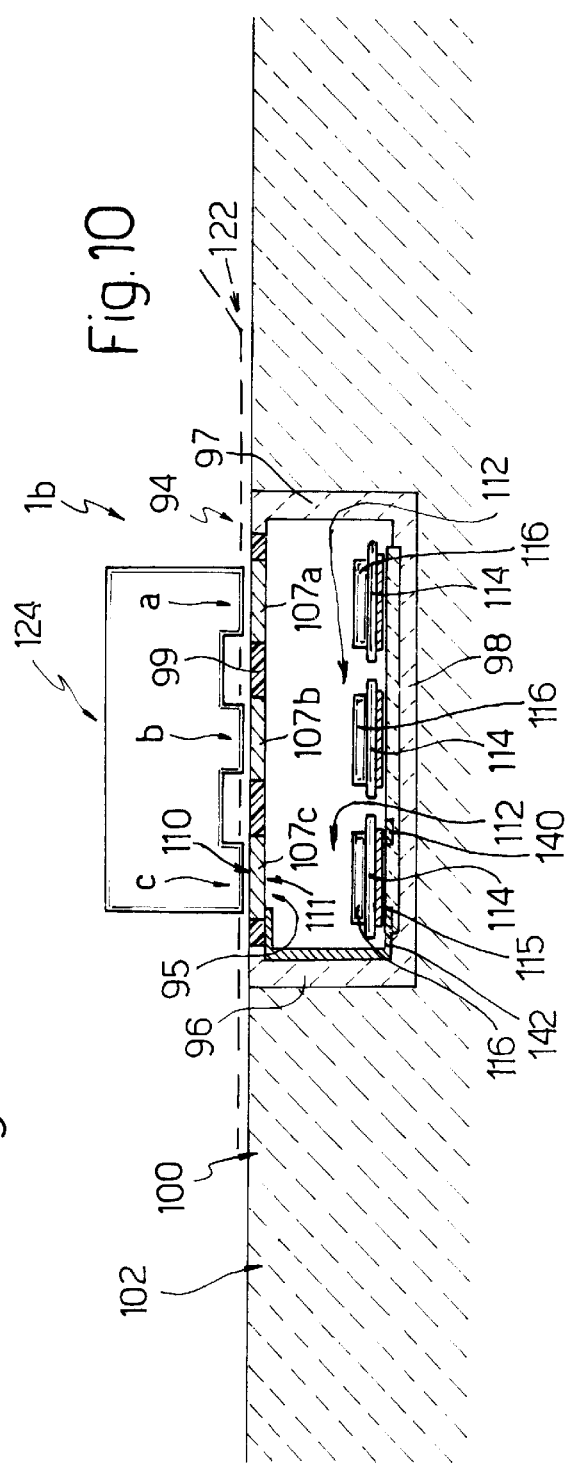

SUPPLY LINE FOR AN ELECTRIC VEHICLE AND TRANSPORT SYSTEM USING IT

BACKGROUND OF THE INVENTION

This invention relates to a supply line for an electric vehicle and to a transport system supplied thereby.

Supply lines are known for electric vehicles and, in particular, for railroad vehicles, comprising a set of conductors (for example, metallic wire-like conductors or metal rails), wherefrom the electric vehicle is able to draw, by means of pickup members extending from the electric vehicle itself (for example, pantographs or sliding shoes), the power required for its operation. Such conductors are carried by suitable supports (such as poles) located along a railroad line in such a way as not to be easily accessible, for instance, overhead with respect to the railroad line, or near the rails.

In operation, the supply lines of the type described above are permanently energized and must be located, for obvious safety reasons, in protected areas, generally not accessible by either passengers or personnel. As a consequence, both supply line implementation and arrangement are subject, with respect to the railroad line, to a number of restraints. For example, some underground railway supply lines comprise live rail, laid on the surface of the rails, which is obviously inaccessible; this is why the rail surface cannot be used, in the event of an accident, as an escape route until power to the supply rail is cut off.

Moreover, known surface supply lines have a negative impact on the environment, since both conductors and their supports are fully visible, so much so that known surface supply lines are difficult to incorporate in existing urban structures. Be it enough to think of the impact on the environment caused by streetcars and trolley-vehicles in towns and cities.

Known trolley supply lines have a further drawback, in that the pickup members are not replaced automatically and correctly, with respect to the contact line, if the former become unhooked.

Self-insulated supply lines have been further proposed, comprising a plurality of conductive segments positioned at roadway level, separated electrically from one another and aligned in the traveling direction of the electric vehicle. Such supply lines operate with electric vehicles fitted with first and second pickup members spaced apart and extending from the vehicle towards the conductive segments. Said first and second pickup members, respectively, contact first and second conductive segments, connected to a first and a second supply line (for example, a positive electric line and a return line) via remote control switching members. Switching of the electrical supply is controlled by the electric vehicle by means of a drive signal, supplied to the supply line. For example, the drive signal may comprise a magnetic field for closing a Hall-effect switch inside the remote control switching member, to connect an electric supply line to a conductive segment.

The devices for generating the drive signal of known self-insulated supply lines are highly complex and expensive; moreover, due to their complex electromechanical structure, remote control switching members are also very expensive and difficult to manufacture and service.

In such supply lines, each individual conductive segment or set of conductive segments requires power supply and is energized independently, regardless of the state of the other segments. Therefore, each segment must be actively controlled, thus resulting in speed and timing problems.

Known self-insulated supply lines therefore comprise highly complex circuits, in proportion to the number of conductive segments per unit of length, are unreliable, highly expensive and difficult to service.

SUMMARY OF THE INVENTION

It is an object of the present invention to provide a supply line for electric vehicles, designed to overcome the drawbacks of known supply lines.

According to the present invention, there is provided a supply line for an electric vehicle, comprising a plurality of conductive elements, arranged in a traveling direction of the electric vehicle and separated electrically from one another; a hollow supporting structure; at least a first conductive line carried inside said supporting structure; and at least one ribbon-like element, carried inside said supporting structure and arranged in said traveling direction, substantially along the whole length of the supply line; said ribbon-like element being elastically deformable and comprising at least one portion made of ferromagnetic material; said portion made of ferromagnetic material interacting with a magnetic field created by excitation means carried by said electric vehicle, to draw at least one portion of said ribbon-like element into a contact position, wherein an electrical connection is established between said first conductive line and at least one of said conductive elements; wherein each of said conductive elements communicates electrically with first collectors and with second collectors housed inside said supporting structure; said supporting structure further housing said first conductive line and a second conductive line separated from said first conductive line; said ribbon-like element establishing an electrical contact between said second conductive line and said collectors for the portions of said ribbon-like element in a rest position, in which said ribbon-like element is undeformed elastically and rests on said second collectors and on said second conductive line; and said ribbon-like element establishing an electrical contact between said first conductive line and said first collectors for the portions of said ribbon-like element in said contact position. The present invention further relates to a transport system wherein an electric vehicle further comprises a pickup extending from the electric vehicle towards said electric supply line and mating with the energized one of the plurality of conductive elements to draw the necessary energy for supplying the electric vehicle.

BRIEF DESCRIPTION OF THE DRAWINGS

The present invention will be better described by way of a preferred, non-limiting example, with reference to the accompanying drawings, in which:

FIG. 9 shows a schematic longitudinal section of a second variation of the supply line in FIG. 1; and FIG. 10 shows a cross section of the variation in FIG. 9.

DETAILED DESCRIPTION OF THE INVENTION

Figure 1:
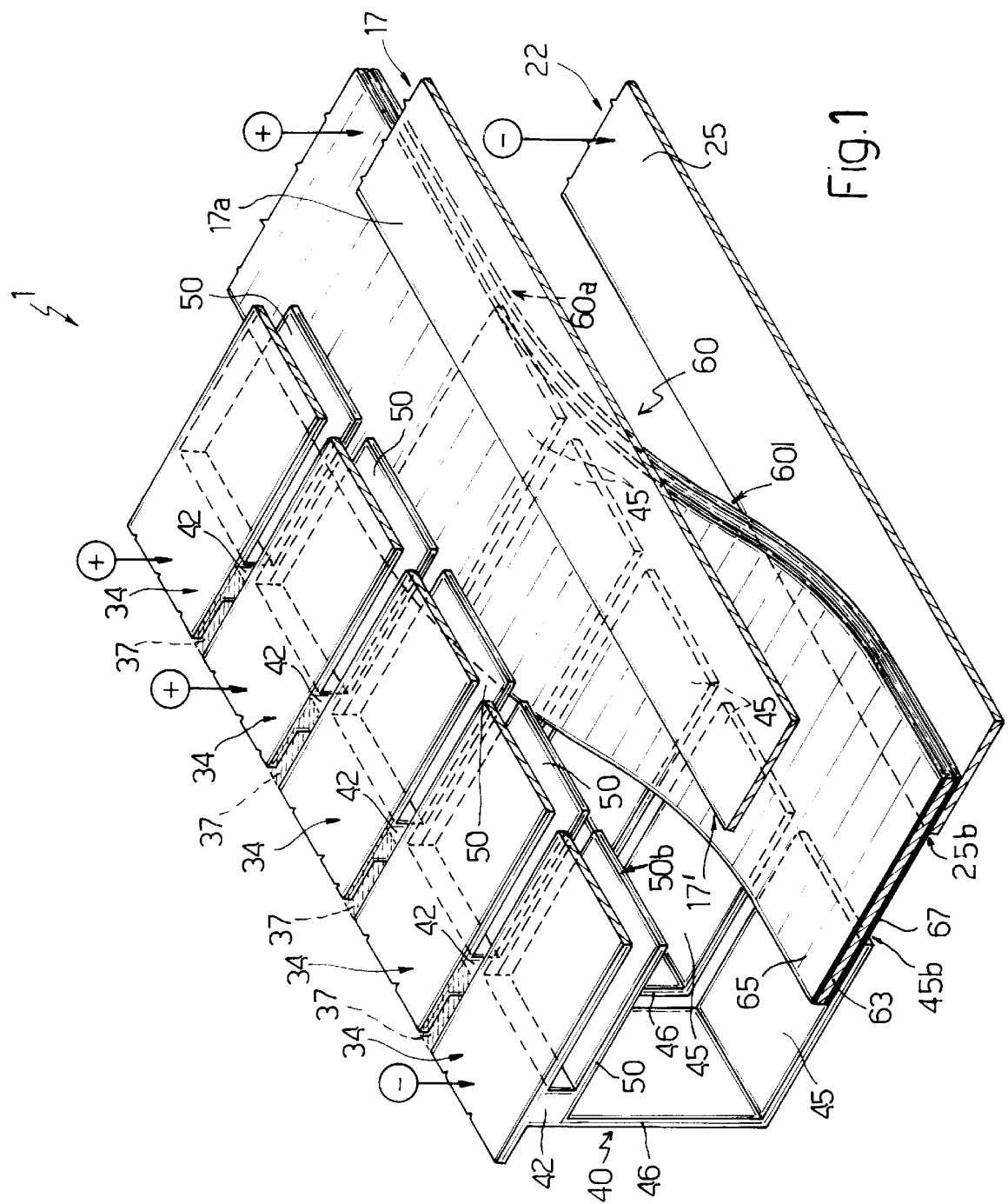
FIG. 1 shows a schematic perspective view of a supply line for an electric vehicle in accordance with the teachings of the present invention.
Figure 2:
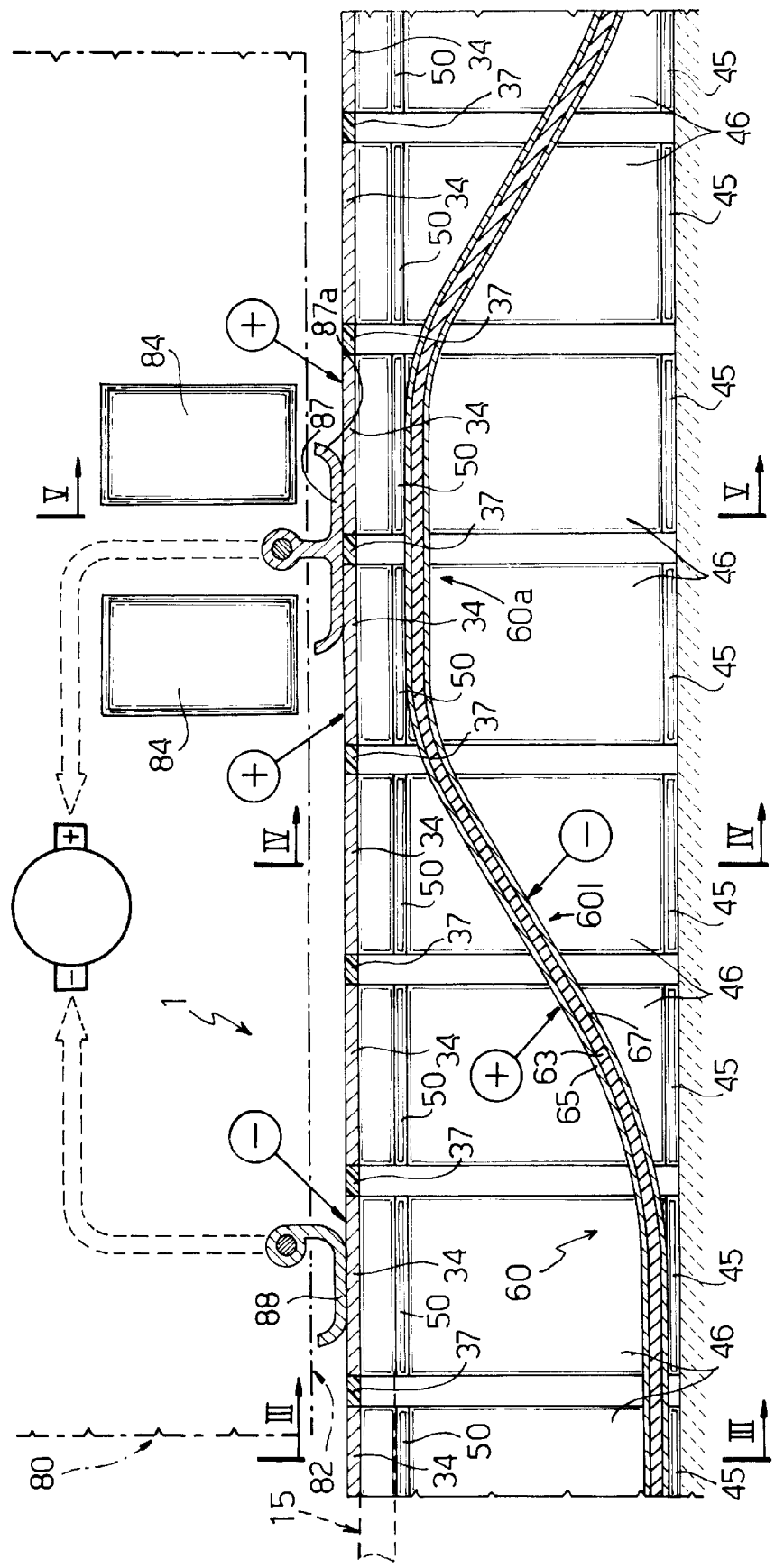
FIG. 2 shows a schematic longitudinal section of the supply line in FIG. 1.

With reference to FIGS. 1 and 2, number 1 indicates as a whole a supply line for an electric vehicle.

Supply line 1 comprises (FIG. 3) an insulating casing 4 (not shown in FIG. 1 for simplicity's sake) defining in its interior an elongated parallelepiped cavity 6 extending in a straight direction along an axis 8.

In particular, casing 4 comprises (FIGS. 3, 4 and 5) a horizontal bottom insulating wall 10, two vertical insulating side walls 11, 12 perpendicular to wall 10, and a horizontal top insulating wall 15 parallel to and opposite wall 10.

Within casing 4 there is housed a first electric supply line 17 comprising a straight metallic conductive element in an upper portion of cavity 6, adjacent to walls 15 and 12. In particular, conductive element 17 has a substantially L-shaped cross section, and comprises a first horizontal flat portion 17a adjacent and parallel to insulating wall 15, and a second vertical flat portion 17b perpendicular to portion 17a and supported by a vertical shoulder 19 (made of insulating material) parallel and adjacent to vertical wall 12.

Casing 4 further houses a second electric supply line 22 comprising a flat metallic bottom wall 25, superimposed on insulating wall 10, and a vertical metallic wall 27 perpendicular to and integral with wall 25 and interposed between shoulder 19 and insulating wall 12. Electric supply line 22 further comprises an upper metallic wall 29 perpendicular to and integral with wall 27, housed inside wall 15, and substantially extending the full width of wall 15.

The FIG. 1 schematic view of electric supply lines 17 and 22 shows only portion 17a and wall 25, which are parallel to and facing each other and extend along axis 8 along the whole length of supply line 1.

Figure 3:
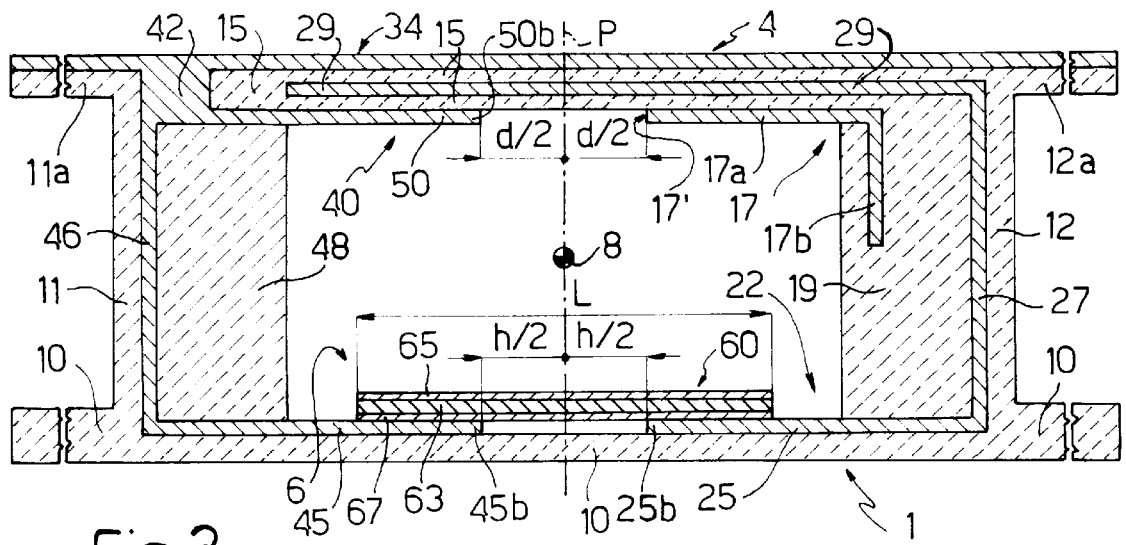
FIG. 3 shows a section of the electric supply line along line III—III in FIG. 2.

In particular, with reference to FIGS. 1 and 3, supply line 1 comprises a plurality of rectangular metallic plates 34 carried by wall 15 and located outside casing 4. In particular, each plate 34 is superimposed on wall 15 and extends the full width of wall 15, with end portions supported on plate 34 and side edges 11a, 12a of walls 11 and 12. Supply line 1 further comprises a plurality of insulating elements 37 (FIG. 1), located on wall 15, outside casing 4, and interposed between plates 34. In particular, each insulating element 37 is interposed between and electrically separates two adjacent metallic plates 34. Furthermore, each metallic plate 34 communicates a with respective electrical distributor 40 housed inside cavity 6 and connected to plate 34 by an electrical conductor 42 extending through wall 15.

Distributor 40 substantially comprises a C-shaped metallic wall comprising a first horizontal flat portion 45 supported on insulating wall 10, and a second vertical portion 46 perpendicular to and integral with portion 45, and interposed inserted between insulating wall 11 and a shoulder 48 made of insulating material. Distributor 40 further comprises a third horizontal flat portion 50 perpendicular to and integral with vertical portion 46, and parallel and adjacent to insulating wall 15.

Flat portions 50 and 45, therefore, are located on opposite sides of cavity 6, and are parallel to and facing each other. Respective portions 50 and 45 of distributors 40 are located along axis 8, along the whole of length of supply line 1, and respectively define first and second collectors, the function whereof shall be explained later on.

Flat portion 45 (second collector) is coplanar with flat wall 25 of electric supply line 22. Flat portion 45 and flat wall 25 are separated electrically from each other, and comprise respective edges 45b and 25b facing and parallel to each other. Edges 45b and 25b are also equidistant (distance equal to h/2) from a plane P of symmetry of casing 4, perpendicular to walls 10 and 15.

Flat portion 50 (first collector) is coplanar with portion 17a of electric supply line 17. Flat portion 50 and portion 17a are separated electrically from each other, and comprise respective edges 50b and 17' facing and parallel to each other. Edges 50b and 17' are also equidistant (distance equal to d/2) from plane P of symmetry.

Distributor 40 further comprises a ribbon-like conductive element 60 located inside cavity 6 and extending the whole length of supply line 1. In its rest position, ribbon-like element 60 is substantially perpendicular to and symmetrical with plane P. Opposite end portions (not shown) of ribbon-like element 60 are carried by articulated devices (not shown) located at the ends of supply line 1.

Ribbon-like element 60 comprises a central portion 63, defined by a strip of flexible insulating material supporting conductive portions located on opposite sides of insulating strip 63. In particular, insulating strip 63 supports a flexible upper conductive strip 65 integral with and superimposed on insulating strip 63 and made of ferromagnetic material. Strip 65 faces wall 15, and is of a width L greater than the distance d between facing edges 50b and 17'.

Ribbon-like element 60 further comprises a lower conductive portion defined by a metal strip 67, facing wall 10 and integral with central insulating strip 63.

The width L of metal strip 67 is greater than the distance h between facing edges 45b, 25b.

In use, supply line 1 can be laid between the rails (not shown) of a railroad line (not shown), with casing 4 embedded in the ballast (not shown) of the railroad bed. In such an arrangement, plates 34 face upwards and are substantially coplanar with the rails. Moreover, supply line 22 is conveniently connected to a ground potential, while supply line 17 is connected to a positive supply potential.

Electric supply line 1 is used in conjunction with an electric vehicle, for example, a railroad vehicle 80 (schematically shown in FIG. 2) traveling along the railroad line (not shown).

The center portion of electric vehicle 80 is defined by a floor 82 facing and parallel to plates 34. Electric vehicle 80 comprises, internally, a pair of electromagnets (or permanent magnets) 84 for generating a magnetic field from floor 82 towards casing 4.

When electric vehicle 80 is not engaging supply line 1, conductive element 60 is in a rest position (FIG. 3), in which it is substantially undeformed and parallel to bottom wall 10. In particular, in the rest position, conductive strip 67 is substantially parallel to bottom wall 10 and rests, along the whole length of line 1, on bottom wall 25 of supply line 22 and on the flat portions 45 of distributors 40. An electrical connection is thus established between flat portions 45 and wall 25 and, consequently, between all the distributors 40 (and, therefore, plates 34) and supply line 22.

In this manner, plates 34 are all connected to the ground potential when ribbon-like conductive element 60 is in its rest position. Supply line 1 is therefore intrinsically insulated, in that all its outer parts (plates 34) are at ground potential, and the live parts (line 17) are inside insulating casing 4. In the rest position, (positive) electric supply line 17 is in fact insulated from all the other metallic parts of line 1, in particular, line 17 is insulated and separated physically from portion 50 (first collector).

When electric vehicle 80 engages supply line 1 and electromagnets 84 are active, there is generated a magnetic force, caused by the interaction between the magnetic field created by electromagnets 84 and ferromagnetic conductive portion 65. Conductive element 60 is thus drawn towards electromagnets 84, moves upwards and is deformed. As clearly shown in FIGS. 1, 2 and 5, portion 60a of ribbon-like conductive element 60 affected by the magnetic force is drawn upwards, into the shape of an arc towards wall 15. In particular, portion 60a of conductive element 60 beneath electromagnets 84 (and, therefore, subjected to a strong magnetic force) is positioned parallel and adjacent to wall 15 (FIGS. 2 and 5) with strip band 65 contacting portion 17a of first supply line 17 and at least a first collector 50. An electrical connection is thus established, via strip 65, between first supply line 17 and first collector 50 and, consequently, between supply line 17 and a plate 34. In the example shown in FIGS. 1 and 2, the shape and arrangement of electromagnets 84 are such that strip 65 contacts first collectors 50 of two adjacent distributors 40. In this manner, two adjacent live plates 34 are connected to positive supply line 17. Electric vehicle 80 comprises at least a first pickup device 87 (FIG. 2) located beneath floor 82, near electromagnets 84, to mate with live plates 34 and supply positive electric power to run electric vehicle 80.

Figure 4:
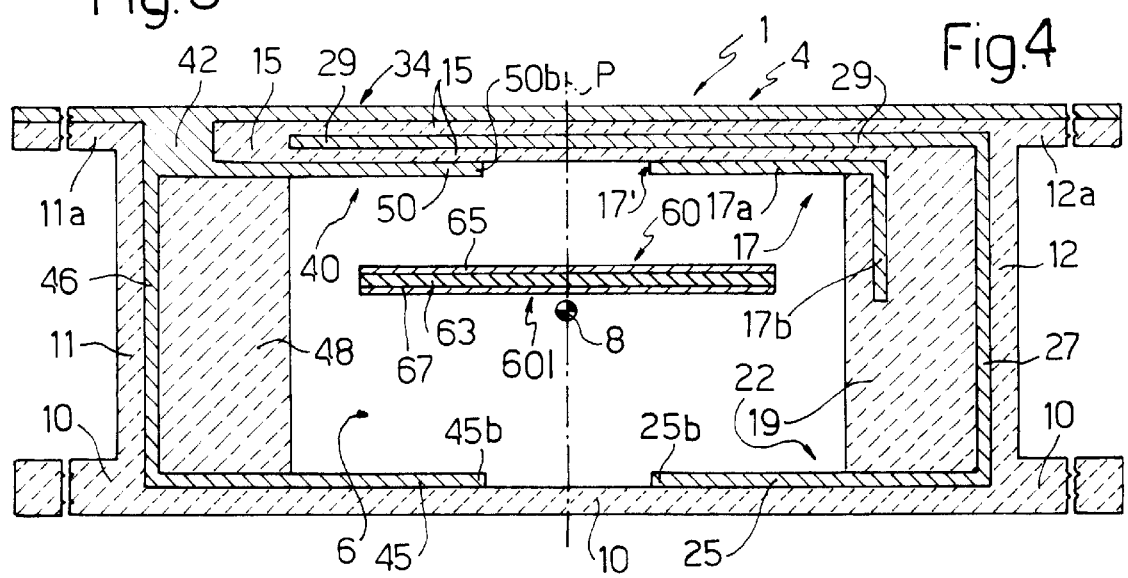
FIG. 4 shows a section of the electric supply line along line IV—IV in FIG. 2.
Figure 5:
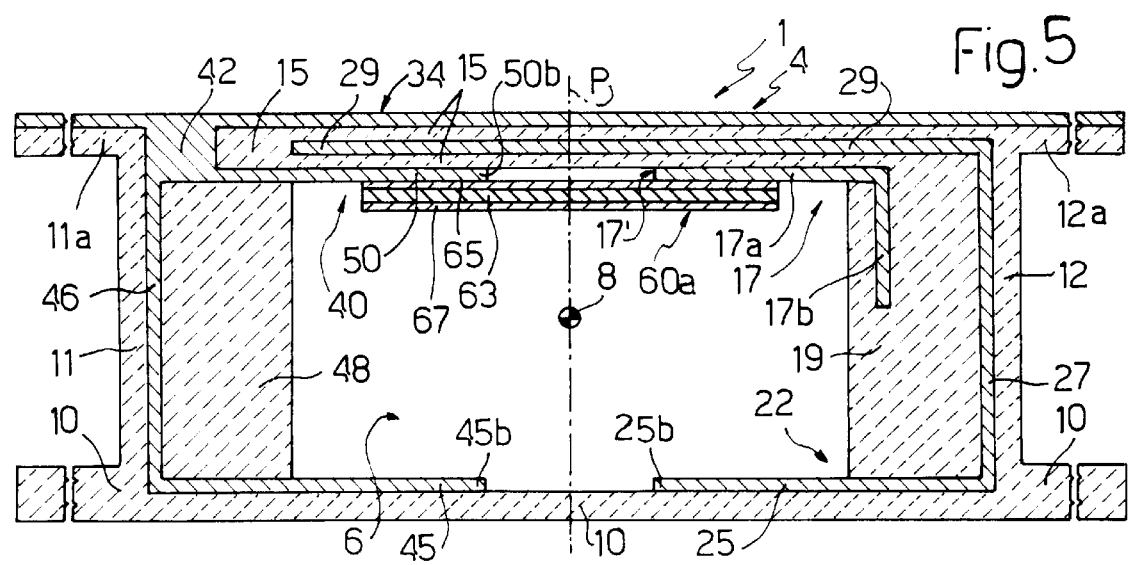
FIG. 5 shows a section of the electric supply line along line V—V in FIG. 2.

The portions of ribbon-like conductive element 60 adjacent to portion 60a are inclined with respect to portion 60a and slant downwards, due to gravity, towards wall 10. Inclined portions 601 are spaced and physically separated from first collector 50 and from second collector 45 (FIG. 4). Portions 601 are also spaced and separated from first supply line 17 and from second supply line 22 (FIG. 4). For this reason, distributors 40 adjacent to distributors 40 of the live plates are not connected to supply lines 17 and 22, and plates 34 adjacent to live plates 34 assume a floating electric potential.

Inclined portions 601 end when ribbon-like conductive element 60 comes to rest on bottom wall 25 of second supply line 22 and on second collectors 45 of distributors 40; in this manner, all the plates 34 of line 1, which are not live and which are not at a floating potential are connected to supply line 22.

Electric vehicle 80 is further provided with at least a second pickup device 88 (FIG. 2) located beneath floor 82, behind/in front of electromagnets 84 in the traveling direction of the electric vehicle. Said pickup device 88 mates with a plate 34 connected to line 22, and supplies negative electric power to run electric vehicle 80.

During motion of electric vehicle 80, successive portions of ribbon-like conductive element 60 are deformed, and portion 60a moves along supply line 1 following the motion of the electric vehicle itself; so that the arc-shaped portion of ribbon-like conductive element 60 travels wave-like from one end of line 1 to the other.

On the grounds of the foregoing, the advantages of the present invention are clearly apparent, in that all the outer conductive parts (plates 34) of supply line 1 are normally connected to a ground potential (supply line 22) when the electric vehicle is not using line 1. Plates 34 are only connected to supply line 17 (for example, at a supply positive potential) when electric vehicle 80 engages supply line 1; moreover, live plates 34 are located beneath the electric vehicle, and are therefore inaccessible. The contact established by ribbon-like conductive element 60 between supply line 17 and distributors 40 of plates 34 is of the infinite-radius rolling type, and such as to produce no sparks, by moving along line 1 with no break in continuity being activated at the front in advance with respect to pickup device 87 (between electromagnets 84), and being deactivated at the rear with a delay with respect to the pickup device.

Supply line 1 therefore provides for a high degree of intrinsic safety (since no parts are permanently live) and may even be located in areas, accessible by passengers and personnel. For example, supply line 1 may be advantageously located on the surface of underground rails, thus enabling the rail surface to be used as an escape route in the event of accident, without necessarily cutting off power to line 1.

Moreover, supply line 1 is of negligible impact in terms of appearance; and is easy to install within existing urban structures.

Pickup devices 87, 88 are connected and disconnected quickly and easily with respect to plates 34.

Moreover, line 1 comprises an extremely straightforward, reliable electromechanical structure, involves no complicated drive circuits, is easy to produce, and cheap to service.

The main difference, as compared with known self-insulated lines lies in the fact that, as stated, in each conductive element, or set of conductive elements of known lines, is energized independently, regardless of the state of the other conductive elements of the line.

As with line 1, on the other hand, once ribbon-like conductive element 60 is drawn upwards, it need simply be maintained in the upward position, with no further steps required to ensure synchronous power supply to plates 34, thus eliminating the speed and timing problems on known lines. Furthermore, such an energizing procedure is, theoretically, independent of the number of plates 34, which, if need be, may be very small, to minimize the live surface portion.

It should also be pointed out that, during motion of electric vehicle 80 (FIG. 2), front end 87a (in the traveling direction of vehicle 80) of pickup device 87 comes into contact with already live plate 34; as a consequence, no sparks are formed between front end 87a and the plates, successively contacted by pickup device 87, thus preventing wear of device 87.

Finally, supply line 1 absorbs no current when not engaged by the electric vehicle.

Figure 6:
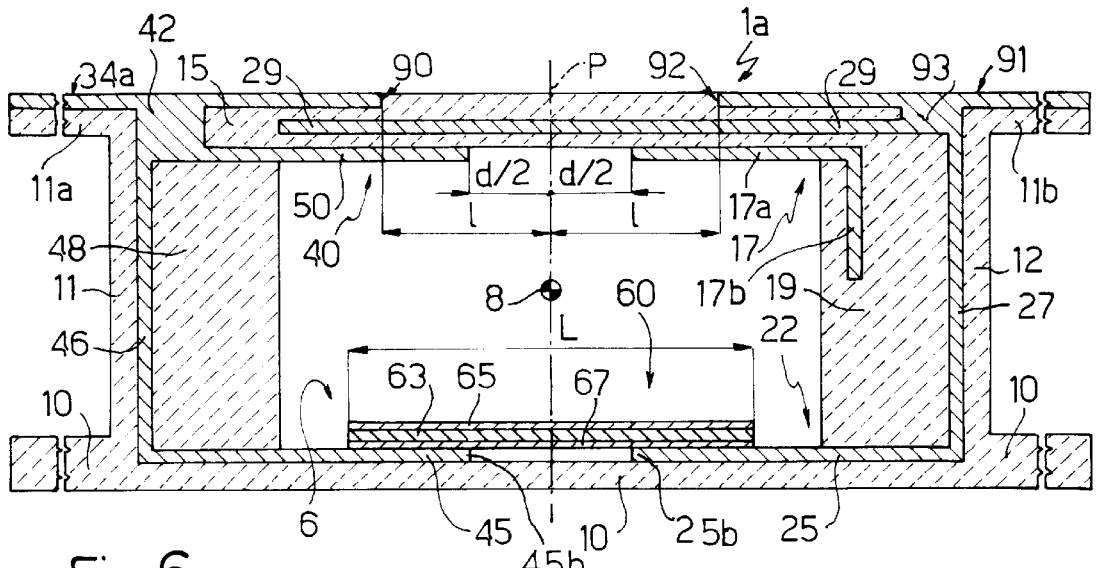
FIGS. 6, 7 and 8 show three cross sections of a first variation of the supply line in FIG. 1.
Figure 7:
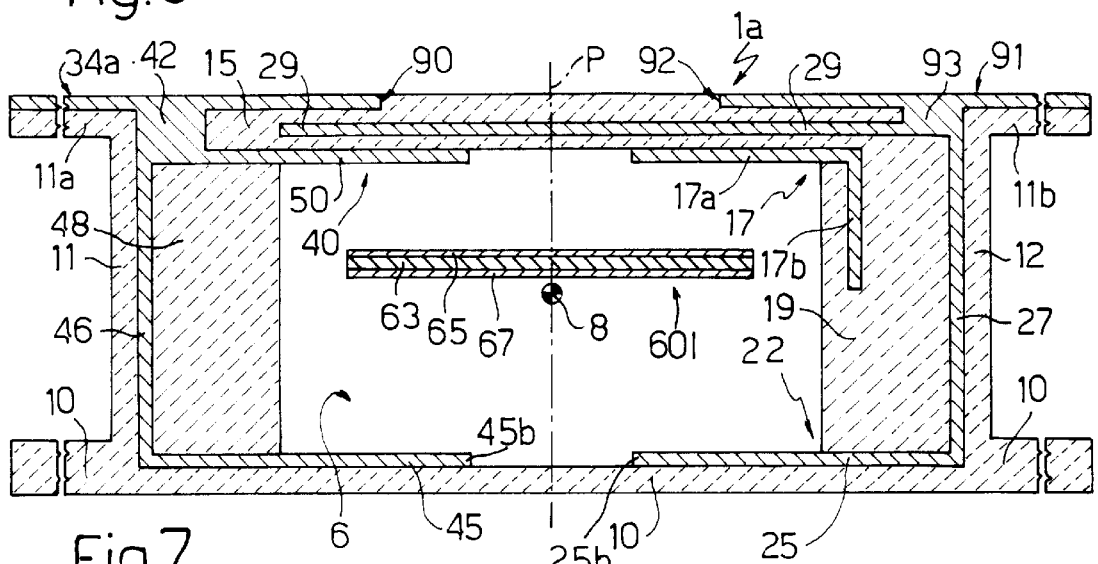
Figure 8:
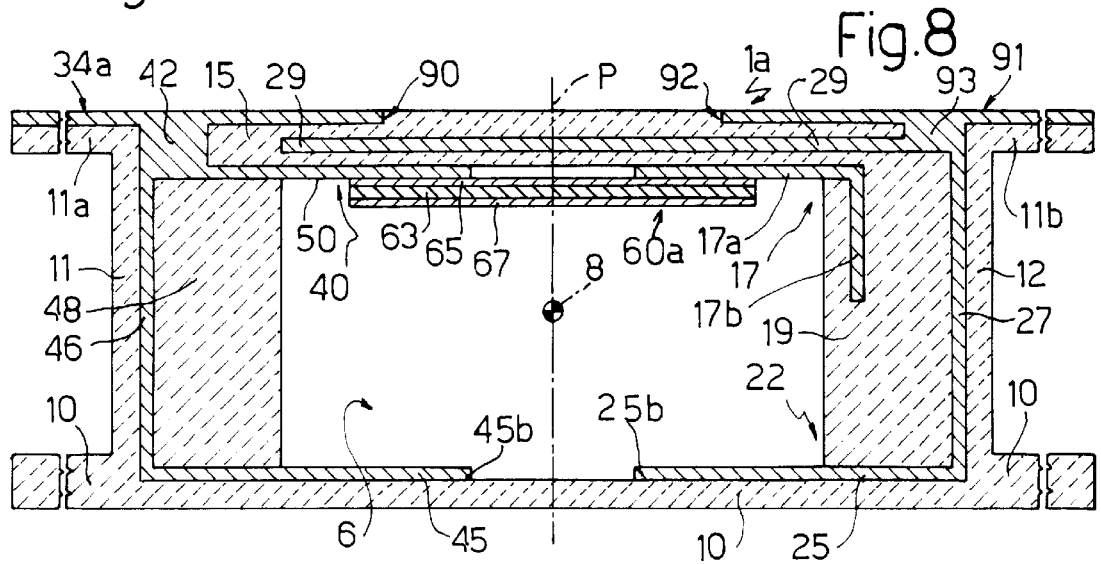

FIGS. 6, 7 and 8 show a first variation 1a of the supply line in FIG. 1; in the description of variation 1a, any parts similar to those described above will be indicated by the same numbers, whereas any new parts or parts with a different structure will be indicated by different numbers.

Supply line 1a comprises a plurality of plates 34a, each extending along only a side portion of wall 15 and, therefore, smaller in width than plate 34. In particular, plate 34a is supported by side edge 11a and by a portion of wall 15, and comprises a straight end edge 90 separated by distance from plane P of symmetry. Plate 34a is connected to distributor 40, the structure whereof is identical to the one already described. Supply line 1a further comprises an outer supply line, defined by an elongated metallic wall 91 supported by wall 15 and located outside casing 4. In particular, wall 91 is supported by side edge 11b and by a portion of wall 15, and comprises a straight end edge 92, separated by distance from plane P of symmetry and parallel to edges 90 of plates 34a. Wall 91, therefore, is opposite plates 34a with respect to plane P of symmetry, and is separated electrically from plates 34a. Wall 91 is further directly connected to supply line 22 by means of a metallic conductor 93 extending from wall 91 to upper wall 29, through insulating wall 15. In this manner, wall 91 is connected at all times to supply line 22, regardless of the arrangement of ribbon-like conductive element 60. Operation of supply line 1a is similar to that previously described for line 1 and, therefore, will not be described in detail. Indeed, plates 34a are connected to supply line 17 or 22 in the same manner as described in connection with plates 34; the main difference with reference to line 1a lies in the presence of outer supply line 91, which is always at the potential of line 22 (ground). The electric vehicle (not shown) using the line may be fitted with a pickup device (not shown) sliding on wall 91 to draw the return electric supply of the vehicle.

FIGS. 9 and 10 show a variation 1b of supply line 1 previously described, and which illustrates a possible three-phase supply configuration. Supply line 1b comprises an elongated insulating casing 94 (FIG. 10) defining in its interior an elongated parallelepiped cavity 95, defined by two parallel opposite vertical side walls 96, 97, a horizontal bottom wall 98, and an insulating upper wall 99 parallel to and opposite bottom wall 98. Casing 94 is embedded in the ground, with wall 99 flush with the road (or surface of the railway 100).

Supply line 1b comprises a plurality of rectangular metal plates 107 carried by wall 99; in particular, supply line 1b comprises a first plurality of plates 107a aligned in a first direction a, a second plurality of plates 107b aligned in a direction b parallel to direction a, and a third plurality of plates 107c aligned in a direction c parallel to direction b.

In the following description, reference is made, for the sake of simplicity, to plates 107, since the structure of each set of plates 107a, 107b, 107c and the parts cooperating therewith is the same.

A face 110 (FIG. 9) of plates 107 faces outwards of casing 94, and a face 111 faces inwards of cavity 95 and is opposite a supply line 112 extending inside cavity 95 in a parallel direction to a, b and c.

In particular, supply line 112 comprises a flexible ribbon-like central element 114 made of insulating material and carrying first and second flexible ribbon-like elements 115, 116 located on opposite sides of ribbon-like element 114 and respectively facing wall 98 and wall 99. Flexible element 115 is made of electrically conductive material, while flexible element 116 is made of conductive material and comprises at least one portion made of ferromagnetic material; in particular, conductive element 116 may comprise a single layer of ferromagnetic conductive material, or two superimposed layers (not shown, for the sake of simplicity), a first of which facing flexible element 114, is made of ferromagnetic material, and a second of which is made of non-ferromagnetic electrically conductive material.

Line 112 extends parallel to the direction of alignment of plates 107 and, at rest, is supported by bottom wall 98. Line 112 comprises end portions (not shown) connected to activated elements (not shown) carried by opposite end portions (not shown) of line 1b. Line 112 may be deformed (as described later on) by drawing one portion towards wall 99.

Second flexible conductive element 116 is connected to a continuous or alternating potential source, to supply an electric vehicle 122 (partially shown) traveling along bed 100.

In particular, conductive elements 116 of the three supply lines 112 in directions a, b and c are connected to three respective outputs of a three-phase source (not shown) to supply electric vehicle 122.

Electric vehicle 122 further comprises a center portion 124 defined by a bottom wall facing wall 99 and positionable facing and parallel to plates 107. Electric vehicle 122 also comprises internally, three pairs of electromagnets (or permanent magnets) 127, for generating magnetic fields towards casing 94. Each pair of electromagnets 127 interacts with a respective line 112, in one of directions a, b, c.

In use, when electric vehicle 122 is not engaging supply line 1b, supply line 112 is in a rest position, wherein second flexible element 115 is substantially undeformed and parallel to bottom wall 98; in this position, an electric bridge contact is established by conductive element 115 between a return electric line 140 (FIG. 10), carried by wall 98, and a contact element 142 communicating electrically with a respective plate 107. In this way, as with line 1, when line 1b is at rest, plates 107 are connected electrically to return line 140 (ground potential). Moreover, in the rest position, conductive element 116 is separated physically from de-energized plates 107.

When electric vehicle 122 engages supply line 1b and electromagnets 127 are activated, a magnetic force of attraction is generated by the field of electromagnets 127 interacting with the ferromagnetic material of flexible element 116. A portion of supply line 112 is thus drawn upwards into an arc from bottom wall 98 towards upper wall 99. As clearly shown in FIG. 9, the portion of line 112 beneath electromagnets 127 (and, therefore, subjected to strong magnetic force), is positioned parallel and adjacent to wall 99, with conductive element 116 contacting face 111 of one or more plates 107.

An electrical connection is thus established between conductive element 116 and at least one plate 107, which is thus energized (live plate). A pickup device 132 between electromagnets 127, rests on face 110 of live plate 107 to draw one phase and supply electric vehicle 122.

During motion of electric vehicle 122, the arc-shaped portion of line 112 travels along supply line 1b following the motion of electric vehicle 122 along the surface of the rails 100; so that the arc-shaped portion of conductive element 116 travels wave-like from one end of line 1b to the other, as with line 1.

Line 1b is a simplified version of line 1, in that, in line 1b, plates 107 are directly energized, by contact with flexible element 116, which acts both as a supply line and a switch contact element. In line 1, plates 34 are indirectly energized by strip 65 contacting line 17 and collectors 50; therefore, in line 1, the ribbon-like conductive element acts only as a switch contact element, in that supply line 17 is separated from ribbon-like element 60.

Alternatively, a three-phase supply line may also comprise three separate elongated hollow casings; each casing carries a plurality of plates (similar to plates 107) and houses a ribbon-like supply line similar to line 112. The three-phase line may further comprise a single insulating strip (not shown) comprising ferromagnetic elements and simultaneously supporting three lines, each carrying a respective phase.

We claim:

1. A supply line for an electric vehicle, comprising:
   a plurality of conductive elements (34;107), arranged in a traveling direction (8) of the electric vehicle (80) and separated electrically from one another;
   a hollow supporting structure (4;94);
   at least a first conductive line (17;112) carried inside said supporting structure (4;94) for supplying electricity of at least one polarity; and at least one ribbon-like element (60;112), carried inside said supporting structure (4;94) and arranged in said traveling direction (8), substantially along the whole length of the supply line;

said ribbon-like element (60;112) being elastically deformable and comprising at least one portion made of ferromagnetic material (65;116);

said portion made of ferromagnetic material (65;116) interacting with a magnetic field created by excitation means (84;127) carried by said electric vehicle (80), to draw at least one portion (60a) of said ribbon-like element (60;112) into a contact position, wherein an electrical connection (50,67,17;112,107) is established between said first conductive line (17;112) and at least one of said conductive elements (34;107);

wherein each of said conductive elements (34) communicates electrically (42) with first collectors (50) and with second collectors (45) housed inside said supporting structure (4;94);

said supporting structure (4;94) further housing said first conductive line (17) and a second conductive line (22) separated from said first conductive line (17);

said ribbon-like element (60) establishing an electrical contact between said second conductive line (22) and said second collectors (45) for the portions of said ribbon-like element (60) in a rest position, in which said ribbon-like element (60) is undeformed elastically and rests on said second collectors (45) and on said second conductive line (22); and said ribbon-like element (60) establishing an electrical contact between said first conductive line (17) and said first collectors (50) for the portions of said ribbon-like element (60) in said contact position.

2. A supply line according to claim 1, wherein said supporting structure (4;94) is made of an insulating material and includes an elongated inner cavity (6;95), extending in said traveling direction (8) and housing said ribbon-like element.

3. A supply line according to claim 2, wherein said conductive elements (34;107) comprise plates, which are separated electrically from each other and carried by said insulating supporting structure (4;94).

4. A supply line according to claim 1, wherein said first collectors (50), and said second collectors (45) comprise flat conductive portions housed inside said supporting structure (4;94) and facing each other on opposite sides of said supporting structure (4;94);

said first conductive line (17) and said second conductive line (22) comprising respective elongated, flat conductive portions (17a,25) housed inside said cavity (6), facing each other and substantially extending along the whole length of said supply line;

said ribbon-like conductive element (60) comprising:

insulating strip means (63), substantially extending along the whole length of said supply line;

first ferromagnetic conductive elements (65), supported by a first side of said insulating strip means (63) and facing said first collectors (50) and said first conductive line (17);

second conductive elements (67) supported by a second side of said insulating strip means (63) and facing said second collectors (45) and said second conductive line (22);

said second conductive elements (67) establishing an electrical bridge connection between said second conductive line (22) and said second collectors (45) for the portions of said ribbon-like element (60) in said rest position; and said first conductive elements (65) establishing an electrical bridge connection between said first conductive line (17) and said first collectors (50) for such segments of said ribbon-like element (60) in said contact position.

5. A supply line according to claim 4, wherein said first conductive line (17) comprises a contact portion (17a) substantially coplanar with a contact portion (50) of said first collector;

said first conductive elements (65) being of a width greater than the distance (d) between adjacent edges (50b,17') of said contact portions of said first collectors (50) and of said first conductive line (17);

said first conductive elements (65) being capable of bridging contact between said contact portion of the first collectors (50) and the contact portion of the first conductive line (17).

6. A supply line according to claim 5, wherein said second conductive line (22) comprises a contact portion (25) substantially coplanar with a contact portion of said second collectors 45;

said second conductive elements (67) being of a width (L) greater than the distance (h) between adjacent edges (45b,25b') of said contact portions of said second collectors (45) and of said second conductive line (22);

said second conductive elements (67) being interposed with respect to the portion of the ribbon-like conductive element in said rest position, between said contact portion of said second collectors (45) and the contact portion (25) of said second conductive line (22).

7. A supply line according to claim 6 characterized in that said second conductive line (22) has a substantially C-shaped cross section; said first conductive line (17) being surrounded by said C-shaped section.

8. A supply line according to claim 1, characterized in that each conductive element (34) communicates electrically (42) with at least first collectors (50) housed inside said supporting structure (4;94);

said supporting structure (4;94) housing said first conductive line (17), and said ribbon-like element (60) establishing an electrical contact between said first conductive line (17) and said first collectors (50) for the portions of said ribbon-like element (60) in said contact position.

9. A supply line according claim 1, wherein said ribbon-like conductive element (112) comprises at least a first flexible conductive element (116) defining said first conductive line.

10. A transport system of the type comprising an electric supply line (1, 1a, 1b) and an electric vehicle (80,122), drawing the necessary energy for its operation from said electric supply line (1, 1a, 1b), wherein said electric supply line (1, 1a, 1b) comprises:

a plurality of conductive elements (34;107) arranged in a traveling direction (8) of the electric vehicle (80, 122) and separated electrically from one another;

a hollow supporting structure (4;94) for supporting said conductive elements (34; 107);

at least a first conductive line (17;112) carried inside said supporting structure (4;94); and at least one ribbon-like element (60;112) carried inside said supporting structure (4;94) and arranged in said traveling direction (8) substantially along the whole length of the supply line;

said ribbon-like element (60;112) being elastically deformable and comprising at least one portion made of ferromagnetic material (65;114);

wherein said electric vehicle (80,122) further comprises excitation means (84;127) for creating a magnetic field towards said electric supply line (1, 1a, 1b) to draw at least one portion of said portion (65;114) made of ferromagnetic material into a contact position, wherein an electrical connection is established (50,67,17;112, 107) between said first conductive line (17;112) and at least one of the plurality of conductive elements (34;107) which is thus energized;

said electric vehicle (80,122) further comprising pickup means (87,132) extending from the electric vehicle (80,122) towards said electric supply line (1,1a,1b) and mating with said energized one of the plurality of conductive elements to draw the necessary energy for supplying said electric vehicle;

wherein each of said conductive elements (34) electrically communicates (42) with first collectors (50) and with second collectors (45) housed inside said supporting structure (4;94);

said supporting structure (4;94) further housing said first conductive line (17) and a second conductive line (22) separated from said first conductive line (17);

said ribbon-like element (60) establishing an electrical contact between said second conductive line (22) and said second collectors (45) for the portions of said ribbon-like element (60) in a rest position, in which said ribbon-like element (60) is undeformed and rests on said second collectors (45) and on said second conductive line (22; and said ribbon-like element (60) establishing an electrical contact between said first conductive line (17) and said first collectors (50) for the portions of said ribbon-like element (60) in said contact position.

11. A transport system according to claim 10, wherein said pickup means (87) are located on one side of said excitation means (84), in a traveling direction of said electric vehicle (80).

12. A transport system according to claim 11, wherein said excitation means (84) comprises at least one permanent magnet.

13. A transport system according to claim 10, wherein said excitation means (84) comprises at least one electromagnet.

14. A supply line for an electric vehicle (80), comprising:

a plurality of conductive elements (34;107), arranged in a traveling direction (8) of said electric vehicle (80), said plurality of conductive elements (34:107) being separated from one another;

a hollow supporting structure (4;94) for supporting said conductive elements (34;107);

at least a first conductive line (17;112) carried inside said supporting structure (4;94); and at least one ribbon-like member (60;112), carried inside said supporting structure (4;94) and arranged along said traveling direction (8) substantially along the whole length of the supply line;

said ribbon-like element (60;112) being elastically deformable and comprising at least one portion, made of ferromagnetic material (65;114);

said portion made of ferromagnetic material (65;114) interacting with a magnetic field created by excitation means (84;127) carried by said electric vehicle (80), to draw at least one portion (60a) of said ribbon-like element (60;112) into a contact position, wherein an electrical connection (50,67,17;112,107) is established between said first conductive line (17;112) and at least one of said conductive elements (34;107);

wherein said ribbon-like element (60;112) comprises:

a flexible central ribbon-like element (63;114) made of insulating material;

a first ribbon-like conductive element (65;116) being carried by said central ribbon-like element of insulating material; and a second conductive element (67;115), carried by said central ribbon-like element of insulating material (63;114) and located on the opposite side with respect to said first conductive element (65;116).

15. A supply line according to claim 14, characterized in that said first ribbon-like conductive element (116) comprises at least one portion made of ferromagnetic material;

said conductive elements comprising plates (107) carried by an insulating wall (99) of said supporting structure (94);

each plate (107) having an upper face (110) facing outwards of said supporting structure (94), and a lower face (111) facing inwards of said supporting structure (94) and towards said ribbon-like element (112);

said ribbon-like element (112) when in said contact position, being positioned with said first flexible conductive element (116) electrically contacting a lower face (111) of at least one of said plates (107).

16. A supply line according to claim 14, wherein said supply line further comprises contact elements (142) communicating with respective plates (107) for the portions of said supply line (112) in a rest position in which said ribbon-like element is substantially undeformed, said second conductive element (115) establishing an electrical contact between an electric return line (140) and said contact elements (142).

17. A supply line according to claim 14, wherein said supply line further comprises contact elements (142) communicating with respective plates (107) for the portions of said supply line (112) in a rest position in which said ribbon-like element (112) is substantially undeformed, said second flexible conductive element (115) establishing an electrical contact with said contact elements and defining an electric return line.

* * * * *